May 17, 1960     R. G. CAMPBELL, SR     2,936,990
HOOD MOUNT
Filed Sept. 4, 1956
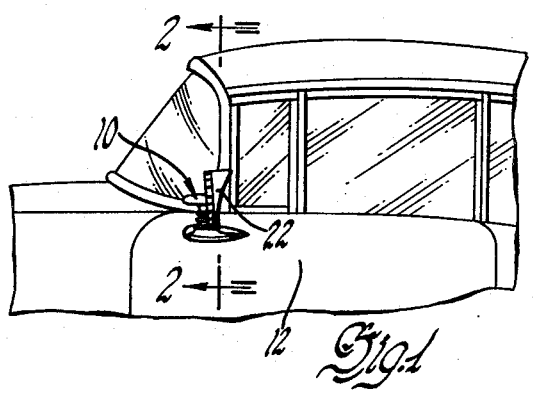
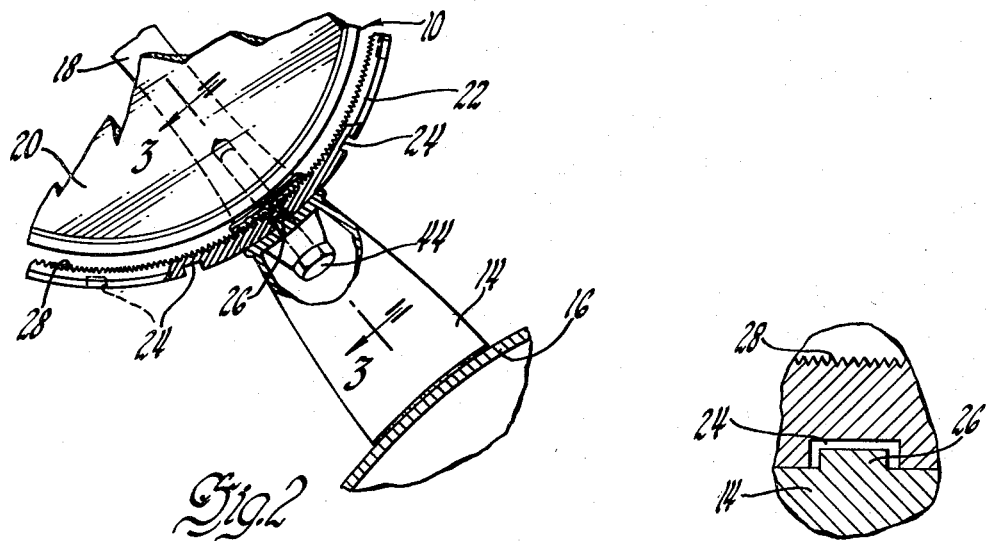
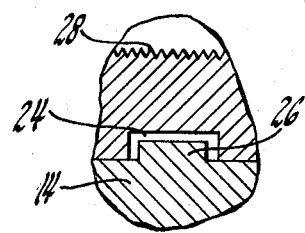
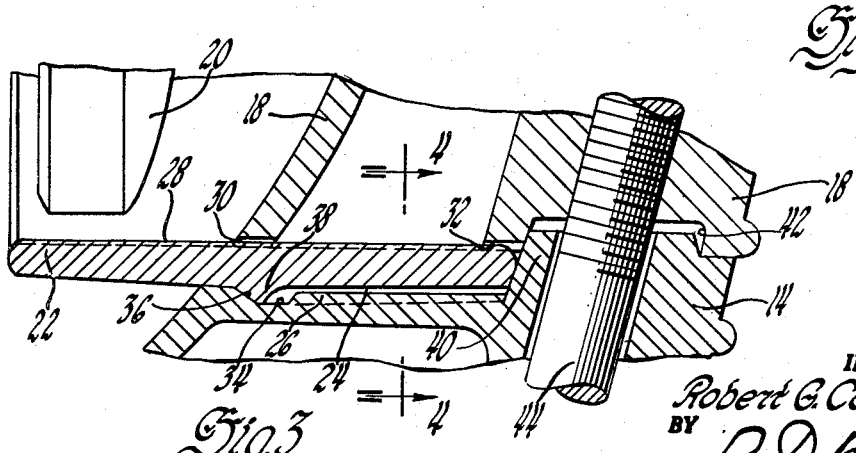
INVENTOR.
Robert G. Campbell, Sr.
BY
L. D. Burch
ATTORNEY.

ately 2,936,990
Patented May 17, 1960

2,936,990
HOOD MOUNT

Robert G. Campbell, Sr., Pontiac, Mich., assignor to General Motors Corporation, Detroit, Mich., a corporation of Delaware Application September 4, 1956, Serial No. 607,712

2 Claims. (Cl. 248—288)

This invention relates to a hood mount for automotive accessories and is particularly applicable to mounts for hoods associated with outside mirrors, spotlights, etc.

In keeping with styling advances in the automotive industry, as well as to provide for water and dust protection, it has been common to provide hoods which surround certain exterior automotive accessories. These hoods have been particularly used with outside mirrors. In the past the hoods have been mounted permanently to either the supporting base or to the frame of the mirror itself. When such an arrangement is used, mirror assemblies must be separately manufactured and designed to be used for either one side of the automobile, or the other. The need has been recognized for a completely interchangeable mount which is adapted to be mounted on either side of the automobile with equal facility and without the necessity of separate manufacture and stocking of accessories designated for the left side only and right side only.

It is proposed to provide a hood mount which may be mounted on either side of the automobile and will conform with the symmetry of the automotive styling.

Figure 1 shows an outside rear-view mirror embodying the invention and secured to the left side of an automobile.

Figure 2 is a partial section of the mirror of Figure 1 taken along the line 2—2.

Figure 3 is an enlarged cross sectional view taken along line 3—3 of Figure 2.

Figure 4 is a further enlarged cross sectional view taken along line 4—4 of Figure 3.

Mirror assembly 10 is adapted to be mounted on the outside of automobile 12 in such a position that it will afford the driver an excellent view to the rear of the automobile. Base 14 of assembly 10 may be secured by any suitable means to the exterior panel 16 of the automobile door. Arm 18 is removably attached to base 14 and provides the support for mirror 20. Any suitable mirror support may be utilized, such as a ball stud and socket.

Hood 22 is secured between base 14 and arm 18 and is concentric with mirror 20. Hood 22 may be of any suitable ornamental design. It is common to design mirror hoods which are symmetrical about a vertical hood diameter but asymmetrical about a horizontal hood diameter when the hood is mounted on the automobile. Since such hoods are not symmetrical throughout their circumference, they must be rotatable to attach them for installation on either side of an automobile in order to keep the symmetrical diameter in a vertical plane. Hood 22 is therefore provided with a peripherally spaced series of longitudinally extending grooves 24 which may be engaged by land 26 formed on the upper surface of base 14. Hood 22 may also be provided with serrations 28 on its inner circumference. The lower surfaces 30 and 32 of arm 18 may be formed with corresponding serrations which engage the serrations 28 of the hood. Land 26 preferably does not extend the full length of the surface of base 14 which is in contact with hood 22. The outer end of land 26 may terminate at slot 34 which is provided with a beveled edge 36. Hood 22 may be provided with a raised portion 38 which may extend around a portion or all of the circumference of the hood and from which grooves 24 are formed. The rear end of portion 38 may terminate in a beveled edge which is adapted to engage beveled edge 36 of slot 34. The forward edge of hood 22 may also be beveled to match the rear surface of pilot 40.

Arm 18 may be attached to base 14 by means of base pilot 40, pilot receiving chamber 42 located in arm 18, and bolt 44. Bolt 44 extends through pilot 40 and chamber 42 and is threadably engaged with arm 18. When bolt 44 is tightened, hood 22 is effectively clamped in position by the base 14 and arm 18. The beveled surfaces of hood 22 in cooperation with the matching beveled surfaces of pilot 40 and base 14 at 36 provide a wedging action which holds hood 22 securely in position. By providing a series of equally spaced grooves 24 on the outer periphery of the hood, it may be installed on either side of an automobile and have its symmetrical diameter in a vertical position. This is accomplished by choosing the proper groove 24 to be engaged by the land 26 so that when the mirror assembly is in position in the automobile, the symmetrical diameter may be in a vertical position. After the hood is properly located, bolt 44 is tightened and the hood is clamped permanently into position.

Hood 22 is not attached to mirror 20, but is separately mounted to the base and arm assembly. Mirror 20 may therefore be adjusted as desired without disturbing the position of the hood.

When a hood mount embodying the invention is used, only one type assembly need be manufactured and stocked to provide outside accessories which may be mounted on either side of an automobile without detracting from the appearance and usefulness of the accessories.

What is claimed is:

1. A hood and mount for securing said hood in a substantially vertical plane about an automotive accessory mountable on an automobile, said hood being symmetrical about its vertical diameter only and having internal and external longitudinally extending and parallel lands and grooves, a base secured to an exterior panel of an automobile and having at least one land complementary to one of said external grooves and engaged therewith, a channel formed at one end of said base land in transverse relationship to said land, an arm secured to said base, said hood being mounted between said arm and said base, and a circumferential ridge formed integrally with and surrounding said hood and engaging the transverse channel of said base.

2. An automotive accessory mountable on an automobile and comprising a generally annular hood mountable in a substantially vertical plane and formed symmetrically about its vertical diameter only and a mount for said hood for interchangeably inclining said accessory to either side of the vertical while maintaining said hood symmetrical diameter vertical, said hood having widely spaced grooves longitudinally formed on the outer surface thereof parallel to the hood axis, one end surface of said hood being bevelled away from the center of said hood, and an annular land formed circumferentially on said hood and having a surface bevelled opposite said end surface, said mount having a land formed in the upper surface thereof engaging one of said hood grooves and a pair of bevelled surfaces complementary to said hood bevelled surfaces, and means for holding said hood and mount bevelled surfaces in tight engagement whereby said hood is retained on said mount.

References Cited in the file of this patent

UNITED STATES PATENTS

| | | |
|---|---|---|
| 1,278,318 | Edsall | Sept. 10, 1918 |
| 1,578,634 | Borgmann | Mar. 30, 1926 |